(12) United States Patent
Mastrolia et al.

(10) Patent No.: US 11,370,553 B2
(45) Date of Patent: Jun. 28, 2022

(54) SPACE SAVER FITTING FOR EJECTION SEAT CATAPULT

(71) Applicant: AMI Industries, Inc., Colorado Springs, CO (US)

(72) Inventors: Bradley Mastrolia, Colorado Springs, CO (US); Kassidy L. Carson, Colorado Springs, CO (US); Cyle Teal, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 94 days.

(21) Appl. No.: 17/035,422

(22) Filed: Sep. 28, 2020

(65) Prior Publication Data

US 2022/0097856 A1   Mar. 31, 2022

(51) Int. Cl.
*B64D 25/10* (2006.01)
*B64D 11/06* (2006.01)

(52) U.S. Cl.
CPC .......... *B64D 25/10* (2013.01); *B64D 11/0616* (2014.12)

(58) Field of Classification Search
CPC ............................ B64D 25/10; B64D 11/0616
See application file for complete search history.

(56) References Cited

U.S. PATENT DOCUMENTS

| | | | | |
|---|---|---|---|---|
| 2,579,683 A | * | 12/1951 | Lobelle | B64D 25/02 244/122 AC |
| 2,951,420 A | * | 9/1960 | Bohlin | B64D 25/10 89/1.14 |
| 2,982,502 A | * | 5/1961 | Martin | B64D 25/10 244/121 |
| 3,055,619 A | * | 9/1962 | MacDonald, Jr. | F41B 11/00 244/122 AB |
| 3,262,265 A | * | 7/1966 | Benditt | F02K 9/08 60/632 |
| 3,447,767 A | * | 6/1969 | Bagwell | B64D 25/10 60/250 |
| 3,554,472 A | * | 1/1971 | McIntyre | B64D 25/10 244/122 R |
| 3,807,670 A | * | 4/1974 | Sutter | B64D 25/10 244/122 AD |
| 3,979,088 A | * | 9/1976 | McCormick | B64D 25/10 244/122 AD |
| 4,036,456 A | * | 7/1977 | Skinner | B64D 25/10 89/1.816 |

* cited by examiner

*Primary Examiner* — Justin M Benedik
(74) *Attorney, Agent, or Firm* — Snell & Wilmer L.L.P.

(57) ABSTRACT

A fitting for use with an ejection seat system of an aircraft includes a fitting bar configured to extend across a top of a catapult of the ejection seat system and defining an angled slot configured to receive a portion of a gas port of the ejection seat system. The fitting further includes a first leg and a second leg coupled to and extending away from the fitting bar and configured to be pivotally coupled to a smokestack structure of the ejection seat system.

20 Claims, 7 Drawing Sheets

SPACE SAVER FITTING FOR EJECTION SEAT CATAPULT

FIELD

The present disclosure relates to escape systems for aircraft and, more particularly, to systems for retaining a catapult in place relative to a smokestack structure of an ejection seat of the escape system.

BACKGROUND

Certain aircraft may include escape systems designed to eject a member of the flight crew from the aircraft cockpit in certain situations. These escape systems typically include an ejection seat system having at least one seat in which at least one member of the flight crew may rest during flight. The ejection seat system may further include a catapult which may include a rocket or other engine to propel the ejection seat system from a cockpit. An envelope space of an ejection seat system in the cockpit may be important, so much so that it may be the deciding factor when a buyer shops for ejection seat systems.

SUMMARY

Disclosed herein is a fitting for use with an ejection seat system of an aircraft. The fitting includes a fitting bar configured to extend across a top of a catapult of the ejection seat system and defining an angled slot configured to receive a portion of a gas port of the ejection seat system. The fitting further includes a first leg and a second leg coupled to and extending away from the fitting bar and configured to be pivotally coupled to a smokestack structure of the ejection seat system.

In any of the foregoing embodiments, the fitting bar, the first leg, and the second leg are formed monolithic with each other.

In any of the foregoing embodiments, the fitting bar defines at least one fastener aperture configured to receive a fastener to couple the fitting to a portion of the catapult.

Any of the foregoing embodiments may further include a retention wire configured to be coupled to the fitting bar and to the fastener to reduce a likelihood of separation of the fastener relative to the fitting bar.

In any of the foregoing embodiments, the fitting bar further defines a retention aperture configured to receive a retention fastener to couple the retention wire to the fitting bar.

In any of the foregoing embodiments, the first leg and the second leg each define a pivot post extending outward therefrom and configured to interface with a pivot aperture of the smokestack structure to pivotally couple the fitting to the smokestack structure.

In any of the foregoing embodiments, the first leg and the second leg each define a pivot limiter extending outward therefrom and configured to interface with a limiter slot of the smokestack structure to limit a pivot angle of the fitting relative to the smokestack structure.

Any of the foregoing embodiments may further include a retaining ring configured to extend around the pivot post while the pivot post extends through the pivot aperture to resist separation of the pivot post from the smokestack structure.

In any of the foregoing embodiments, the first leg and the second leg each have a bar end coupled to the fitting bar and a distal end opposite the bar end, and wherein the distal end of each of the first leg and the second leg is beveled.

In any of the foregoing embodiments, the fitting is symmetric relative to a midway point on the fitting bar between the first leg and the second leg.

Also disclosed is a system for housing a catapult of an ejection seat system of an aircraft. The system includes a smokestack structure configured to house the catapult. The system further includes a fitting having: a fitting bar configured to extend across a top of the catapult of the ejection seat system and defining an angled slot configured to receive a portion of a gas port of the ejection seat system; and a first leg and a second leg coupled to and extending away from the fitting bar and configured to be pivotally coupled to the smokestack structure.

In any of the foregoing embodiments, the fitting bar defines at least one fastener aperture configured to receive a fastener to couple the fitting to a portion of the catapult.

Any of the foregoing embodiments may further include a retention wire configured to be coupled to the fitting bar and to the fastener to reduce a likelihood of separation of the fastener relative to the fitting bar.

In any of the foregoing embodiments, the fitting bar further defines a retention aperture configured to receive a retention fastener to couple the retention wire to the fitting bar.

In any of the foregoing embodiments, the first leg and the second leg each define a pivot post extending outward therefrom and configured to interface with a pivot aperture of the smokestack structure to pivotally couple the fitting to the smokestack structure.

In any of the foregoing embodiments, the first leg and the second leg each define a pivot limiter extending outward therefrom and configured to interface with a limiter slot of the smokestack structure to limit a pivot angle of the fitting relative to the smokestack structure.

Any of the foregoing embodiments may further include a retaining ring configured to extend around the pivot post while the pivot post extends through the pivot aperture to resist separation of the pivot post from the smokestack structure.

In any of the foregoing embodiments, the first leg and the second leg each have a bar end coupled to the fitting bar and a distal end opposite the bar end, and wherein the distal end of each of the first leg and the second leg is beveled.

Also disclosed is a system for housing a catapult of an ejection seat system of an aircraft. The system includes a smokestack structure [we call it this, which is fine and likely a term of art, but we clarify why it is called this so we can, if needed, have clear support that it is in fact not a smokestack] defining two pivot apertures and configured to house the catapult. The system further includes a fitting having: a fitting bar configured to extend across a top of the catapult of the ejection seat system and defining an angled slot configured to receive a portion of a gas port of the ejection seat system; and a first leg and a second leg coupled to and extending away from the fitting bar and including a pivot post extending outward therefrom and configured to interface with a respective pivot aperture of the two pivot apertures to pivotally couple the fitting to the smokestack structure. The system further includes two retaining rings configured to each extend around one of the two pivot apertures while the pivot post extends through the respective pivot aperture to resist separation of the pivot post from the smokestack structure.

In any of the foregoing embodiments, the first leg and the second leg each define a pivot limiter extending outward therefrom and configured to interface with a limiter slot of the smokestack structure to limit a pivot angle of the fitting relative to the smokestack structure.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
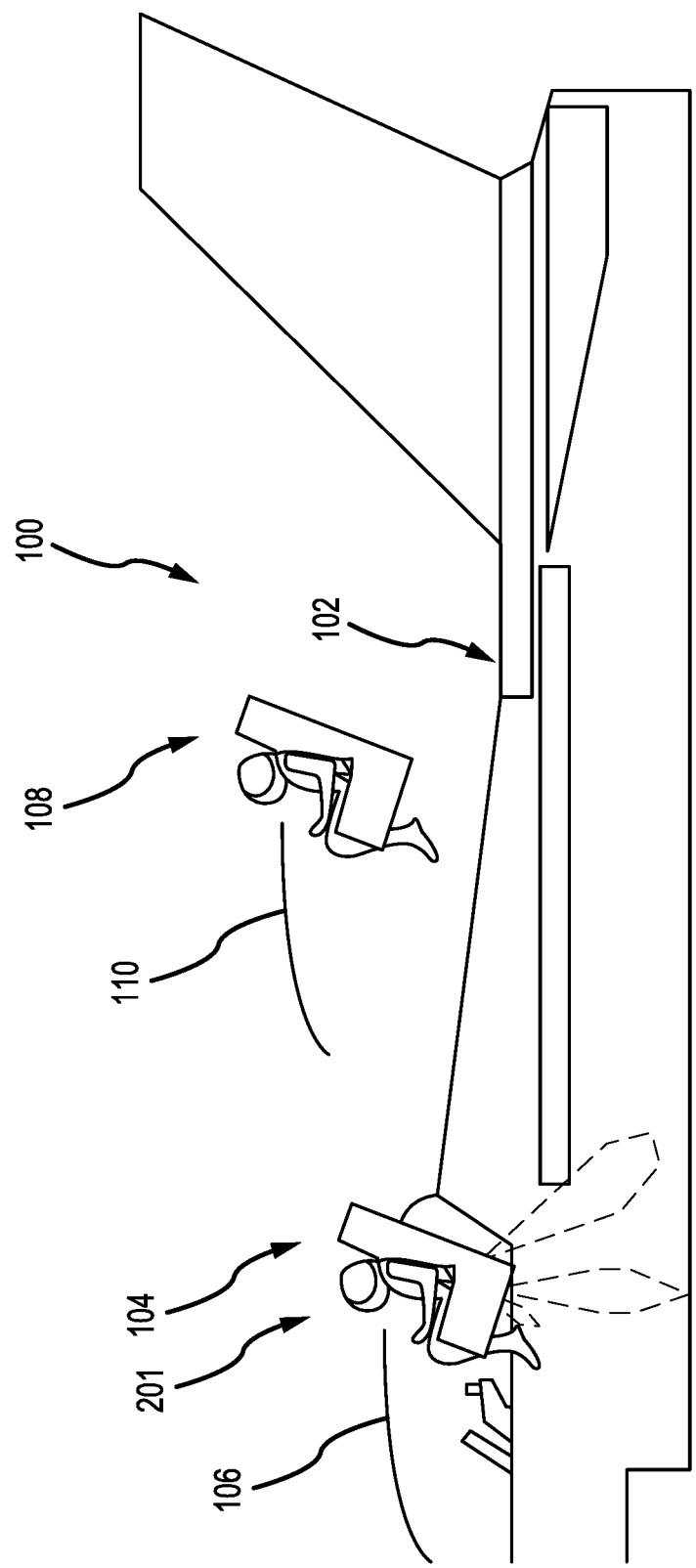
FIG. 1 illustrates an aircraft having two cockpits with respective ejection seat systems and a system for housing a catapult of an ejection seat of one of the ejection seat systems, in accordance with various embodiments.

Referring now to FIG. 1, an aircraft 100 may include a fuselage 102. The fuselage 102 may define or include a cockpit 104 in which one or more member of a flight crew may be located. The fuselage 102 may further define or include a second cockpit 108 in which one or more member of a flight crew may be located. In various embodiments, the cockpit 104 may include one or more escape system 201 to facilitate evacuation of one or more member of the flight crew. In that regard, the first cockpit 104 may include a hatch or canopy 106 that separates from or moves relative to the first cockpit 104 to allow the member or members of the flight crew in the first cockpit 104 to eject from the fuselage 102. The second cockpit 108 may further include a hatch or canopy 110 that separates from or moves relative to the second cockpit 108 to allow the member or members of the flight crew in the second cockpit 108 to eject from the fuselage 102. The aircraft 100 may be a passenger aircraft, a cargo aircraft, a military aircraft, or the like.

Figure 2:
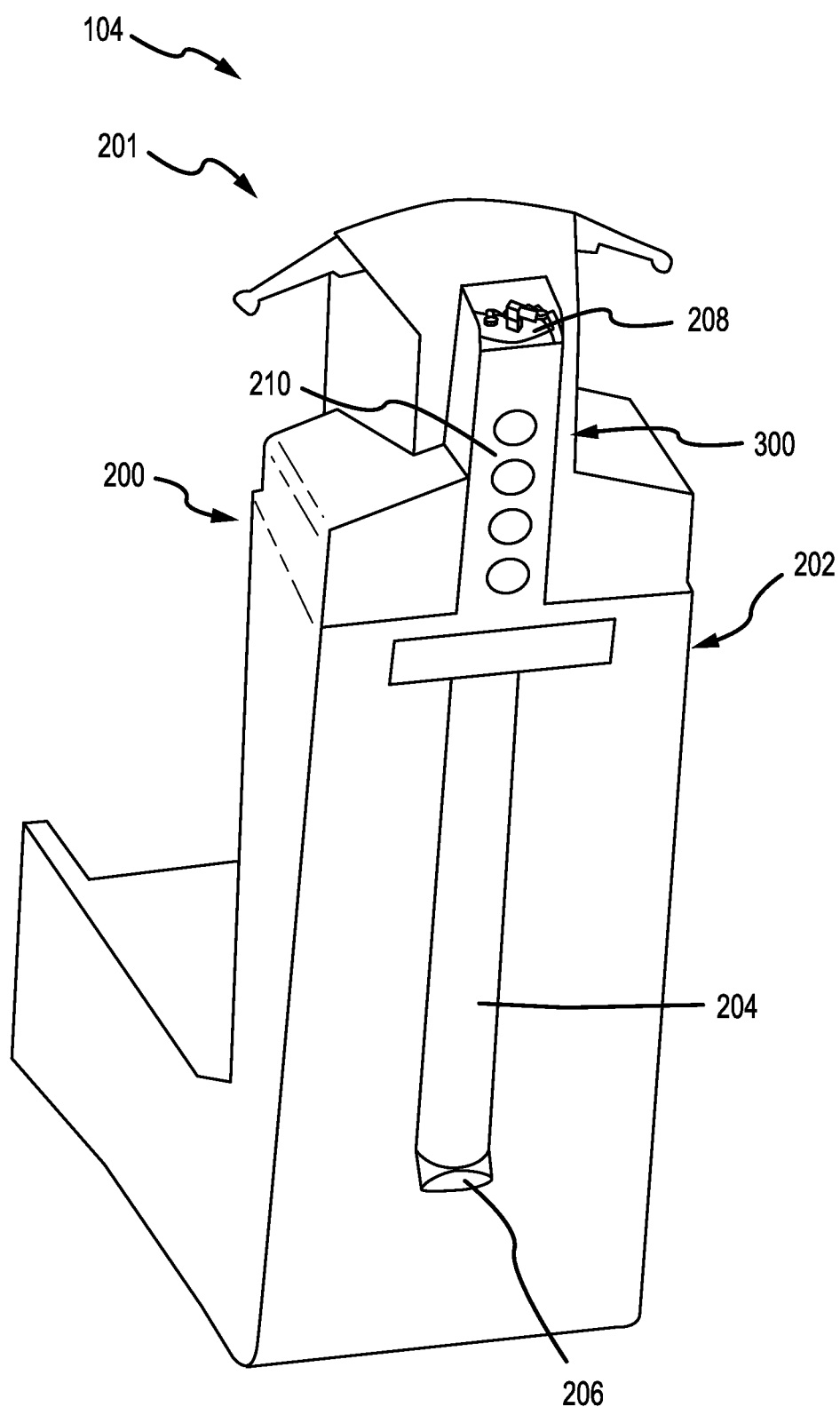
FIG. 2 illustrates a view of an ejection seat system of FIG. 1, in accordance with various embodiments.
Figure 3A:
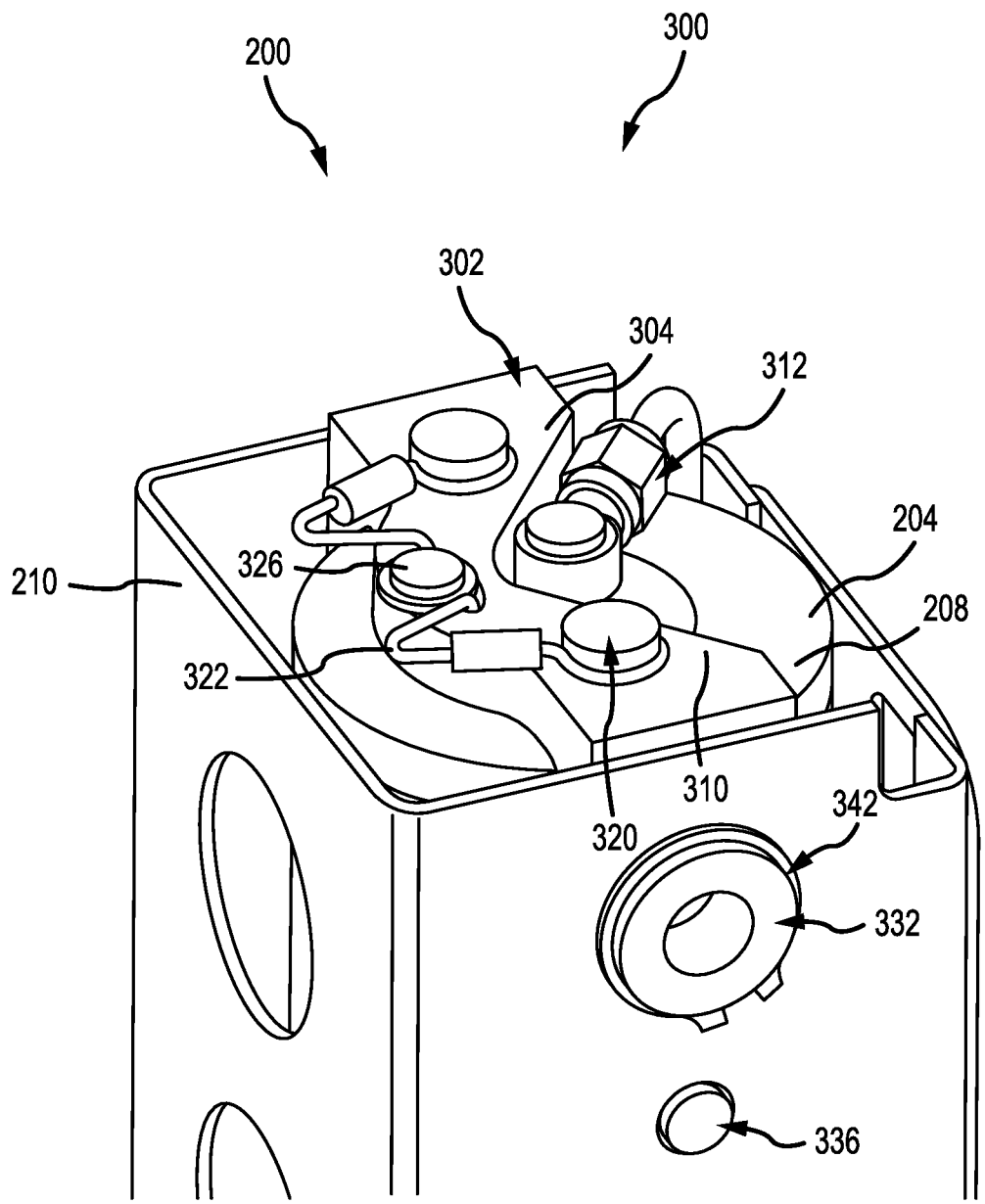
FIG. 3A illustrates an enlarged side perspective view of an installed system for housing a catapult of an ejection seat system, in accordance with various embodiments.
Figure 3B:
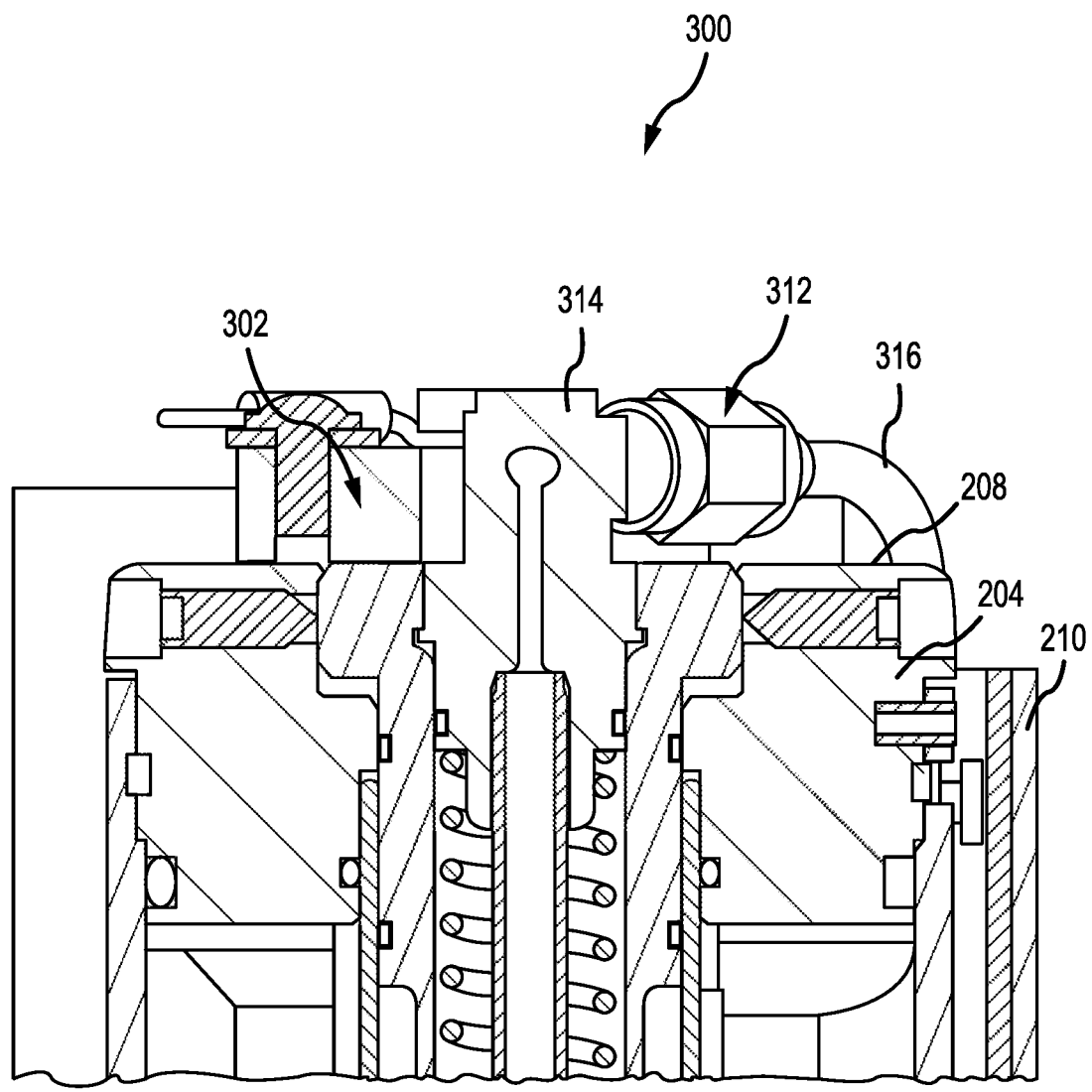
FIG. 3B illustrates a cross-sectional view of the installed system of FIG. 3A, in accordance with various embodiments.
Figure 3C:
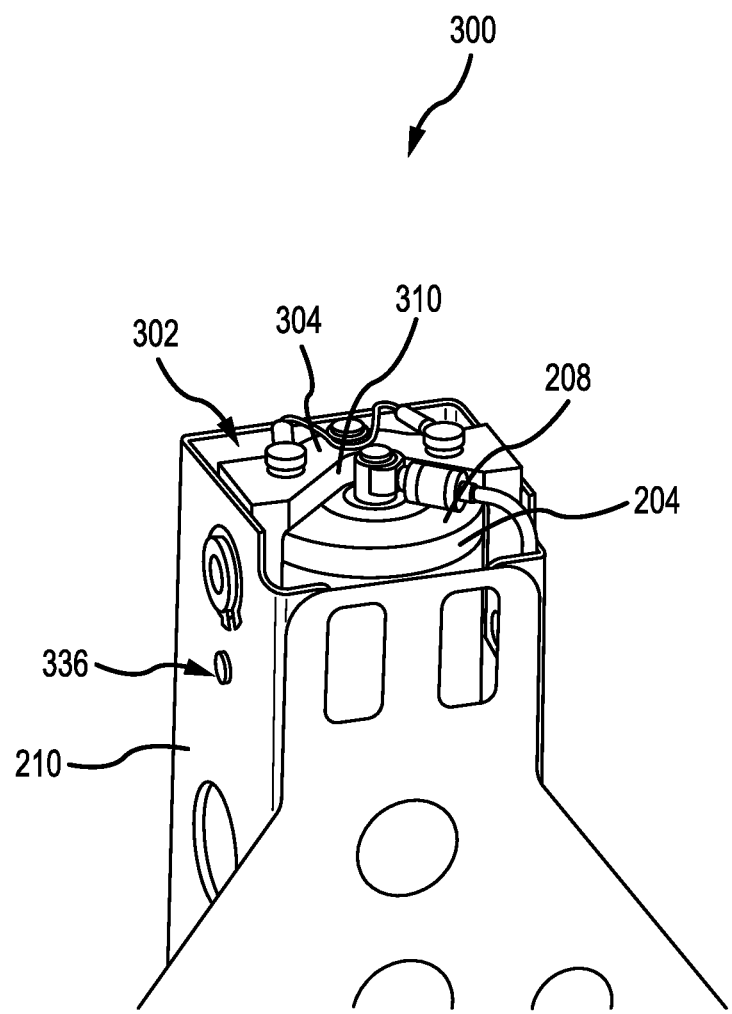
FIG. 3C illustrates a rear perspective view of the installed system of FIG. 3A, in accordance with various embodiments.
Figure 3D:
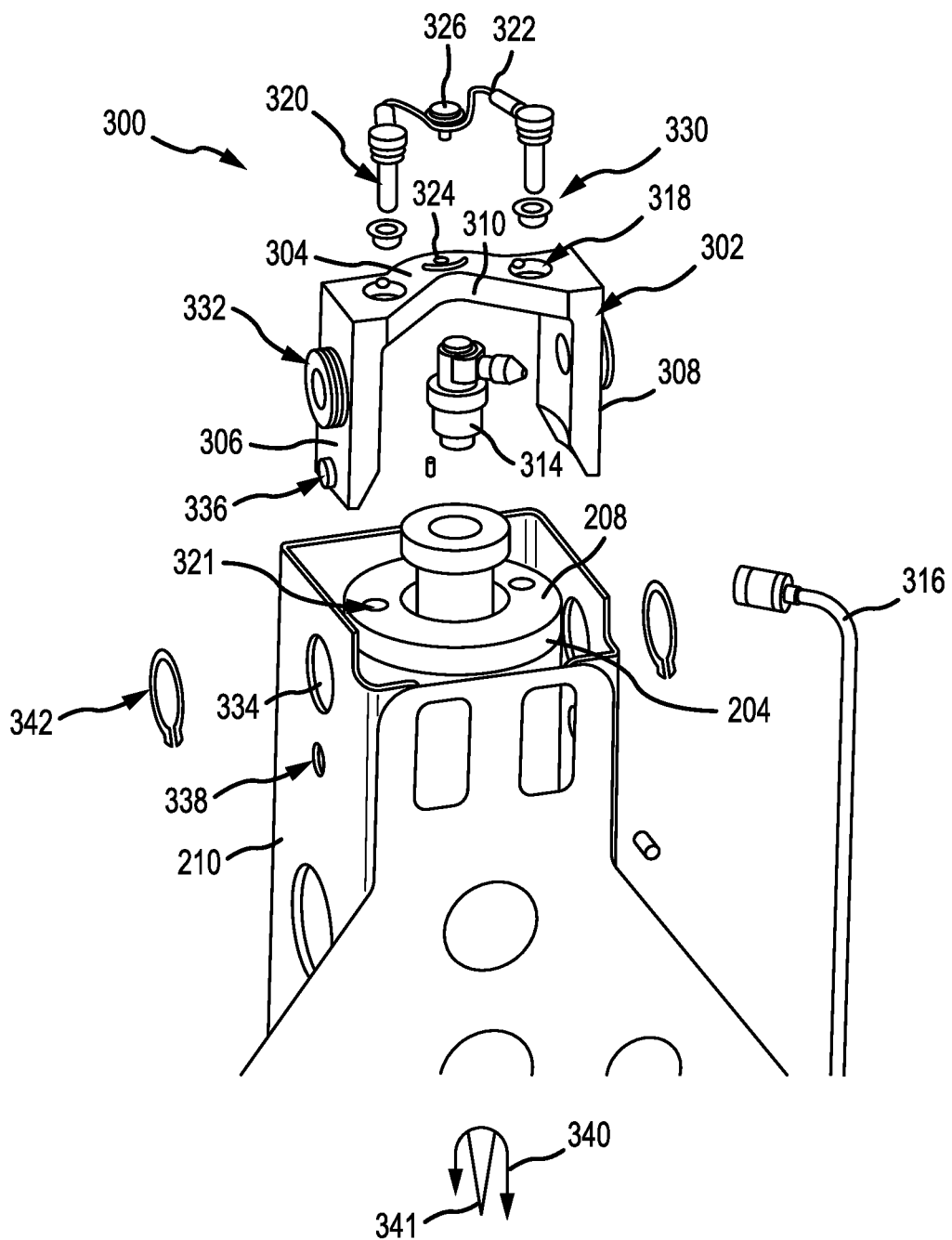
FIG. 3D illustrates a rear exploded view of the system of FIG. 3A, in accordance with various embodiments.
Figure 4:
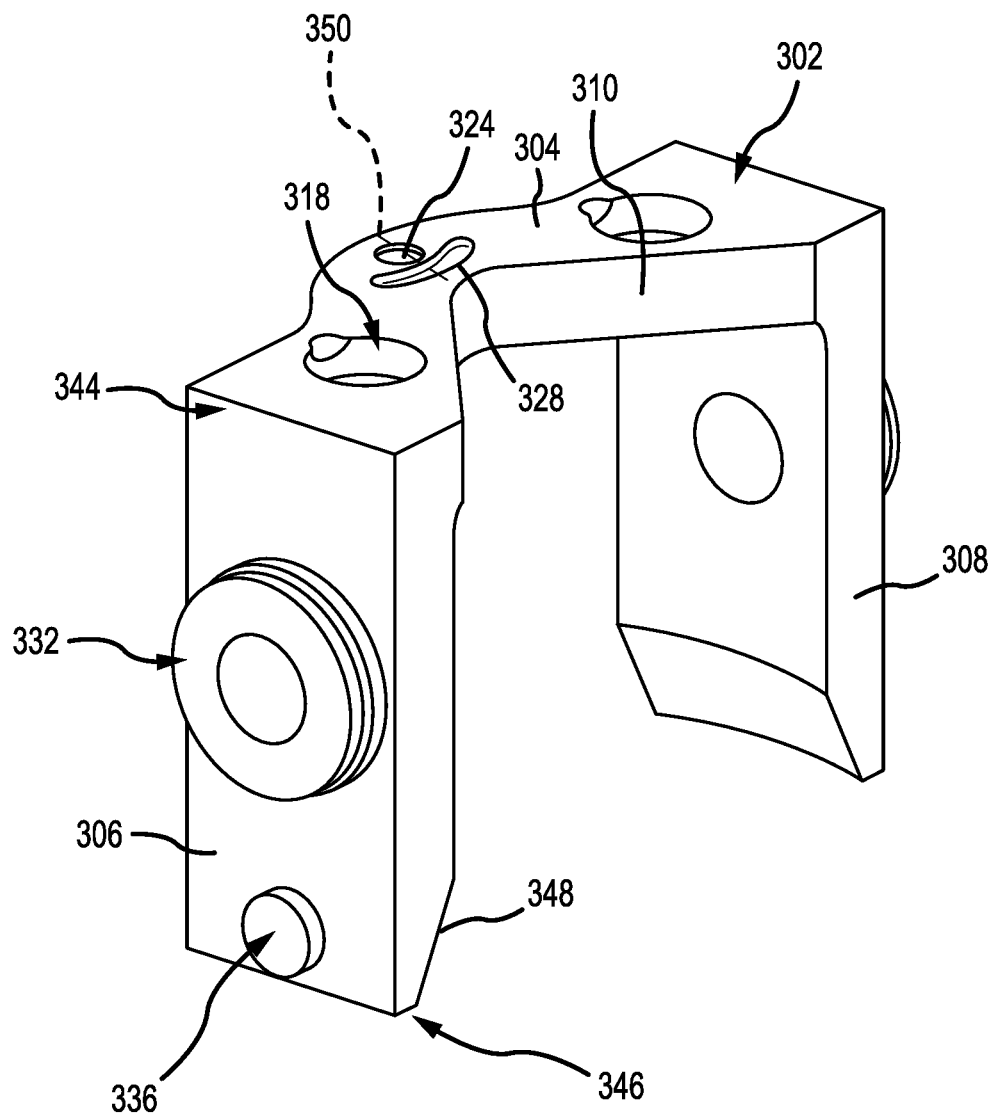
FIG. 4 illustrates a perspective view of a fitting of the system of FIG. 3A, in accordance with various embodiments.

Referring now to FIGS. 1 and 2, the escape system 201 may include an ejection seat system 200. The ejection seat system 200 may include a seat 202 upon which a member of the flight crew may rest. The seat 202 may be propelled out of the cockpit 104 in response to instruction by a member of the flight crew or in response to another action. The ejection seat system 200 may further include a catapult 204 coupled to the seat 202. In particular, the seat 202 may include a smokestack structure 210 in which the catapult 204 may be at least partially housed. The smokestack structure 210 may include any tubular or other at least partially hollow shape capable of housing, or partially housing, the catapult 204. The catapult 204 may include, for example, a rocket or other engine that provides propulsion for ejecting the seat 202 from the cockpit 104. In that regard, the catapult 204 may include a rocket nozzle 206 through which combustion gases may flow to provide propulsion. The catapult 204 may further include a top 208 located at an opposite end of the catapult 204 from the rocket nozzle 206. The ejection seat system 200 may include a system 300 for housing the catapult 204, as described in further detail below.

Referring now to FIGS. 2, 3A, 3B, 3C, 3D, and 4, additional details of the system 300 are shown. The system 300 may include a fitting 302 designed to be coupled to the smokestack structure 210 and to extend across the top 208 of the catapult 204 in order to retain the catapult 204 within the smokestack structure 210. The fitting 302 may include a fitting bar 304, a first leg 306, and a second leg 308. The first leg 306 and the second leg 308 may extend away from the fitting bar 304 in a direction parallel to each other, and may be pivotally coupled to the smokestack structure 210. The fitting bar 304 may extend across the top 208 of the catapult 204 and may resist separation of the catapult 204 from the smokestack structure 210.

The fitting bar 304 may define an angled slot 310. The angled slot 310 may include any shape such as a triangular shape, a chevron shape, a semicircular shape, or the like. The angled slot 310 is designed to allow a gas port fitting 312 to extend away from the top 208 of the catapult 204 without interacting with the fitting bar 304. In particular, the gas port fitting 312 may couple a gas port elbow 314 on the catapult 204 to a gas port tube 316. Auxiliary gas from the catapult 204 may be provided to the seat 202 via the gas port tube 316 and the gas port elbow 314. The shape of the angled slot 310 allows the system 300 to be used with gas ports having a variety of gas port elbow shapes and sizes.

The fitting bar 304 may include or define at least one fastener aperture 318. In various embodiments, the fitting bar 304 may include two fastener apertures 318 in order to provide redundant coupling between the fitting 302 and the catapult 204. The system 300 may further include at least one fastener 320 designed to extend through a respective fastener aperture 318 and be received by a respective aperture 321 of the catapult 204 in order to couple the fitting 302 to the catapult 204. The fasteners 320 may include any fastener such as a captured bolt, a screw, or the like. In various embodiments, a bushing 330 may be positioned in each of the fastener apertures 318 of the fitting 302 in order to receive the fasteners 320.

In various embodiments, the system 300 may further include a retention wire 322.

The retention wire 322 may be coupled to each of the fasteners 320 and to the fitting 302 and may resist separation of the fasteners 320 from the fitting 302. In that regard, the retention wire 322 may be referred to as a fastener leash. The retention wire 322 may include any material or shape capable of reducing the likelihood of the fasteners 320 separating from the fitting 302. The retention wire 322 may reduce the likelihood of the fasteners 320 becoming lost during installation of the system 300. The fitting 302 may further define a retention slot 328 and a retention aperture 324 designed to receive a retention fastener 326. The retention wire 322 may be positioned within the retention slot 328 and the retention fastener 326 may be positioned over the retention wire 322 and through the retention aperture 324 in order to couple the retention wire 322 to the fitting bar 304.

As referenced above, the fitting 302 may be designed to pivot relative to the smokestack structure 210. For example, the fitting 302 may pivot relative to the smokestack structure 210 in a direction shown by an arrow 340. In that regard, each of the legs 306, 308 may include or define a pivot post 332 extending outward therefrom. The smokestack structure 210 may include or define pivot apertures 334 through which the pivot posts 332 may extend. The interface of the pivot posts 332 and the pivot apertures 334 may allow the fitting 302 to pivot relative to the smokestack structure 210. The system 300 may further include retaining rings 342. In response to the pivot posts 332 extending through the pivot apertures 334, the retaining rings 342 may be positioned over the pivot posts 332 to reduce the likelihood of the pivot posts 332 being removed from the pivot apertures 334. In that regard, the pivot posts 332 may each define a slot extending therearound to receive the retaining rings 342.

The legs 306, 308 may each further include or define a pivot limiter 336 extending outward therefrom. The smokestack structure 210 may further include or define limiter slots 338 each configured to receive a respective pivot limiter 336. The amount by which the fitting 302 may rotate relative to the smokestack structure 210 may be referred to as a "pivot angle" 341. The interface between the pivot limiter is 336 and the limiter slots 338 may limit the pivot angle 341.

The legs 306, 308 may each include a bar end 344 which is coupled to the fitting bar 304 and a distal end 346 located opposite the bar end 344. The distal end 346 may include or define a beveled edge 348 which may be oriented towards the opposing leg 306, 308. The beveled edge 348 may be used as a guide when installing the seat 202 onto the catapult 204.

The fitting 302 may be formed from any material such as a metal, a plastic, a composite, or the like. The fitting 302 may be formed using any known technique such as by forming sheet metal, by additive manufacturing, by extrusion, by casting, by forging, or the like. In various embodiments, the fitting 302 may be monolithic. That is, the fitting bar 304, the first leg 306, and the second leg 308 may be formed integral, or monolithic, with each other.

The fitting 302 may have a midway point 350 along the fitting bar 304 halfway between the first leg 306 and the second leg 308. In various embodiments, the fitting 302 may be symmetric (including the angled slot 310) about the midway point 350. This is symmetry allows the fitting 302 to interface with, and be coupled to, catapults having various shapes.

The shape and layout of the system 300 provides advantages relative to conventional escape systems. In particular and referring to FIGS. 1 and 2, a height of the canopy 106 may be limited by a height of the system 300. The orientation and design of the system 300 reduces a height of the system 300 relative to conventional escape systems, allowing the canopy 106 to have a reduced height. This results in a more aerodynamic aircraft 100 and provides additional advantages as well.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fitting for use with an ejection seat system of an aircraft, the fitting comprising:
    a fitting bar configured to extend across a top of a catapult of the ejection seat system and defining an angled slot configured to receive a portion of a gas port of the ejection seat system; and
    a first leg and a second leg coupled to and extending away from the fitting bar and configured to be pivotally coupled to a smokestack structure of the ejection seat system.

2. The fitting of claim 1, wherein the fitting bar, the first leg, and the second leg are formed monolithic with each other.

3. The fitting of claim 1, wherein the fitting bar defines at least one fastener aperture configured to receive a fastener to couple the fitting to a portion of the catapult.

4. The fitting of claim 3, further comprising a retention wire configured to be coupled to the fitting bar and to the fastener to reduce a likelihood of separation of the fastener relative to the fitting bar.

5. The fitting of claim 4, wherein the fitting bar further defines a retention aperture configured to receive a retention fastener to couple the retention wire to the fitting bar.

6. The fitting of claim 1, wherein the first leg and the second leg each define a pivot post extending outward therefrom and configured to interface with a pivot aperture of the smokestack structure to pivotally couple the fitting to the smokestack structure.

7. The fitting of claim 6, wherein the first leg and the second leg each define a pivot limiter extending outward therefrom and configured to interface with a limiter slot of the smokestack structure to limit a pivot angle of the fitting relative to the smokestack structure.

8. The fitting of claim 6, further comprising a retaining ring configured to extend around the pivot post while the pivot post extends through the pivot aperture to resist separation of the pivot post from the smokestack structure.

9. The fitting of claim 1, wherein the first leg and the second leg each have a bar end coupled to the fitting bar and a distal end opposite the bar end, and wherein the distal end of each of the first leg and the second leg is beveled.

10. The fitting of claim 1, wherein the fitting is symmetric relative to a midway point on the fitting bar between the first leg and the second leg.

11. A system for housing a catapult of an ejection seat system of an aircraft, the system comprising:
    a smokestack structure configured to house the catapult; and
    a fitting having:
        a fitting bar configured to extend across a top of the catapult of the ejection seat system and defining an angled slot configured to receive a portion of a gas port of the ejection seat system; and
        a first leg and a second leg coupled to and extending away from the fitting bar and configured to be pivotally coupled to the smokestack structure.

12. The system of claim 11, wherein the fitting bar defines at least one fastener aperture configured to receive a fastener to couple the fitting to a portion of the catapult.

13. The system of claim 12, further comprising a retention wire configured to be coupled to the fitting bar and to the fastener to reduce a likelihood of separation of the fastener relative to the fitting bar.

14. The system of claim 13, wherein the fitting bar further defines a retention aperture configured to receive a retention fastener to couple the retention wire to the fitting bar.

15. The system of claim 11, wherein the first leg and the second leg each define a pivot post extending outward therefrom and configured to interface with a pivot aperture of the smokestack structure to pivotally couple the fitting to the smokestack structure.

16. The system of claim 15, wherein the first leg and the second leg each define a pivot limiter extending outward therefrom and configured to interface with a limiter slot of the smokestack structure to limit a pivot angle of the fitting relative to the smokestack structure.

17. The system of claim 15, further comprising a retaining ring configured to extend around the pivot post while the pivot post extends through the pivot aperture to resist separation of the pivot post from the smokestack structure.

18. The system of claim 11, wherein the first leg and the second leg each have a bar end coupled to the fitting bar and a distal end opposite the bar end, and wherein the distal end of each of the first leg and the second leg is beveled.

19. A system for housing a catapult of an ejection seat system of an aircraft, the system comprising:
    a smokestack structure defining two pivot apertures and configured to house the catapult;
    a fitting having:
        a fitting bar configured to extend across a top of the catapult of the ejection seat system and defining an angled slot configured to receive a portion of a gas port of the ejection seat system; and
        a first leg and a second leg coupled to and extending away from the fitting bar and including a pivot post extending outward therefrom and configured to interface with a respective pivot aperture of the two pivot apertures to pivotally couple the fitting to the smokestack structure; and
    two retaining rings configured to each extend around one of the two pivot apertures while the pivot post extends through the respective pivot aperture to resist separation of the pivot post from the smokestack structure.

20. The system of claim 19, wherein the first leg and the second leg each define a pivot limiter extending outward therefrom and configured to interface with a limiter slot of the smokestack structure to limit a pivot angle of the fitting relative to the smokestack structure.

* * * * *